United States Patent
Koganezawa et al.

(10) Patent No.: US 8,262,477 B2
(45) Date of Patent: Sep. 11, 2012

(54) INFORMATION STORAGE MEDIUM, GAME DEVICE, AND METHOD OF CONTROLLING GAME DEVICE

(75) Inventors: Tsutomu Koganezawa, Urayasu (JP); Masatoshi Ogita, Osaka (JP)

(73) Assignee: Namco Bandai Games Inc., Tokyo (JP)

( * ) Notice: Subject to any disclaimer, the term of this patent is extended or adjusted under 35 U.S.C. 154(b) by 281 days.

(21) Appl. No.: 12/730,758

(22) Filed: Mar. 24, 2010

(65) Prior Publication Data

US 2010/0273544 A1 Oct. 28, 2010

(30) Foreign Application Priority Data

Apr. 22, 2009 (JP) ................................. 2009-104565

(51) Int. Cl.
  *A63F 13/00* (2006.01)
(52) U.S. Cl. ............................................. 463/33; 463/2
(58) Field of Classification Search .............. 463/2, 30, 463/31, 32, 33
  See application file for complete search history.

(56) References Cited

U.S. PATENT DOCUMENTS

| | | | | |
|---|---|---|---|---|
| 6,231,002 | B1 * | 5/2001 | Hibma et al. | 244/3.22 |
| 6,414,622 | B1 * | 7/2002 | Rougas | 342/13 |
| 7,132,928 | B2 * | 11/2006 | Perricone | 340/407.1 |
| 7,632,187 | B1 * | 12/2009 | Farley et al. | 463/53 |
| 2005/0073439 | A1 * | 4/2005 | Perricone | 340/945 |
| 2009/0049001 | A1 * | 2/2009 | Nickerson et al. | 706/52 |

FOREIGN PATENT DOCUMENTS

JP A-11-306394 11/1999

OTHER PUBLICATIONS

Lock On: Modern Air Combat; video game published by Ubisoft and released in Nov. 2003; as evidenced by 40 page package of descriptive material.*

* cited by examiner

*Primary Examiner* — James S McClellan
(74) *Attorney, Agent, or Firm* — Oliff & Berridge PLC

(57) ABSTRACT

An information storage medium storing a program that generates an image of a virtual space viewed from a virtual camera, an operation object and a non-operation object being disposed in the virtual space. The program causes a computer to function as: an operation object movement control section that controls a movement of the operation object in the virtual space based on a movement instruction input about the operation object; a non-operation object movement/motion control section that controls at least one of a movement and a motion of the non-operation object in the virtual space; an attack target setting section that determines whether or not an attack target tracking condition is satisfied by at least one of the operation object and the non-operation object, and sets the non-operation object to an attack target tracking state in which the non-operation object tracks the operation object as an attack target when it is determined that the attack target tracking condition is satisfied; and a display control section that displays an attack target tracking notification image that indicates that the non-operation object is set to the attack target tracking state when the non-operation object is set to the attack target tracking state.

22 Claims, 19 Drawing Sheets

FIG.15

| NON-OPERATION OBJECT ID (410) | POSITION COORDINATES (420) | DIRECTION (430) | LEVEL VALUE (440) | LOCK-ON FLAG (450) |
|---|---|---|---|---|
| NPC-1 | $(x_1, y_1, z_1)$ | $\theta_1$ | 2 | 1 |
| NPC-2 | $(x_2, y_2, z_2)$ | $\theta_2$ | 2 | 1 |
| NPC-3 | $(x_3, y_3, z_3)$ | $\theta_3$ | 3 | 1 |
| NPC-4 | $(x_4, y_4, z_4)$ | $\theta_4$ | 1 | 0 |
| ⋮ | ⋮ | ⋮ | ⋮ | ⋮ |

INFORMATION STORAGE MEDIUM, GAME DEVICE, AND METHOD OF CONTROLLING GAME DEVICE

Japanese Patent Application No. 2009-104565, filed on Apr. 22, 2009, is hereby incorporated by reference in its entirety.

BACKGROUND OF THE INVENTION

The present invention relates to an information storage medium, a game device, and a method of controlling a game device.

A match game (e.g., action game, battle game, or fighting game) that allows the player to cause a character to move or make a motion in a game space while evading (removing) an obstacle or attack by a computer-controlled enemy character, has been known. A match game having a lock-on function (i.e., the player locks on and attacks the enemy) has also been known.

In JP-A-11-306394, whether or not a target is positioned within the sight range is determined, and whether or not an object has been shot (hit) by the player is determined. When it is determined that the object has been shot (hit), a linear object is caused to track the target object.

A more exciting game can be implemented by producing a situation in which the player's character is locked on by the enemy character in addition to a situation in which the player's character locks on the enemy character. However, the player cannot easily deal with a situation in which the player's character is locked on by the enemy character if the player is not notified that the player's character is locked on by the enemy character or the location of the enemy character that locks on the player's character. This may make it difficult for the player to fully enjoy the game.

SUMMARY

According to a first aspect of the invention, there is provided an information storage medium storing a program that generates an image of a virtual space viewed from a virtual camera, an operation object and a non-operation object being disposed in the virtual space, the program causing a computer to function as:

an operation object movement control section that receives a movement instruction input about the operation object, and controls a movement of the operation object in the virtual space based on the received movement instruction input;

a non-operation object movement/motion control section that controls at least one of a movement and a motion of the non-operation object in the virtual space based on a predetermined algorithm;

an attack target setting section that determines whether or not an attack target tracking condition is satisfied by at least one of the operation object and the non-operation object, and sets the non-operation object to an attack target tracking state in which the non-operation object tracks the operation object as an attack target when it is determined that the attack target tracking condition is satisfied;

a display control section that displays an attack target tracking notification image that indicates that the non-operation object is set to the attack target tracking state when the non-operation object is set to the attack target tracking state; and an image generation section that generates an image of the virtual space viewed from the virtual camera, the operation object being disposed in the virtual space.

According to a second aspect of the invention, there is provided a game device that generates an image of a virtual space viewed from a virtual camera, an operation object and a non-operation object being disposed in the virtual space, the game device comprising:

an operation object movement control section that receives a movement instruction input about the operation object, and controls a movement of the operation object in the virtual space based on the received movement instruction input;

a non-operation object movement/motion control section that controls at least one of a movement and a motion of the non-operation object in the virtual space based on a predetermined algorithm;

an attack target setting section that determines whether or not an attack target tracking condition is satisfied by at least one of the operation object and the non-operation object, and sets the non-operation object to an attack target tracking state in which the non-operation object tracks the operation object as an attack target when it is determined that the attack target tracking condition is satisfied;

a display control section that displays an attack target tracking notification image that indicates that the non-operation object is set to the attack target tracking state when the non-operation object is set to the attack target tracking state; and an image generation section that generates an image of the virtual space viewed from the virtual camera, the operation object being disposed in the virtual space.

According to a third aspect of the invention, there is provided a method of controlling a game device that generates an image of a virtual space viewed from a virtual camera, an operation object and a non-operation object being disposed in the virtual space, the method comprising:

an operation object movement control step that receives a movement instruction input about the operation object, and controls a movement of the operation object in the virtual space based on the received movement instruction input;

a non-operation object movement/motion control step that controls at least one of a movement and a motion of the non-operation object in the virtual space based on a predetermined algorithm;

an attack target setting step that determines whether or not an attack target tracking condition is satisfied by at least one of the operation object and the non-operation object, and sets the non-operation object to an attack target tracking state in which the non-operation object tracks the operation object as an attack target when it is determined that the attack target tracking condition is satisfied;

a display control step that displays an attack target tracking notification image that indicates that the non-operation object is set to the attack target tracking state when the non-operation object is set to the attack target tracking state; and an image generation step that generates an image of the virtual space viewed from the virtual camera, the operation object being disposed in the virtual space.

BRIEF DESCRIPTION OF THE SEVERAL VIEWS OF THE DRAWING

FIG. 15 illustrates an example of parameters set for a non-operation object according to one embodiment of the invention.

DETAILED DESCRIPTION OF THE EMBODIMENT

Figure 1:
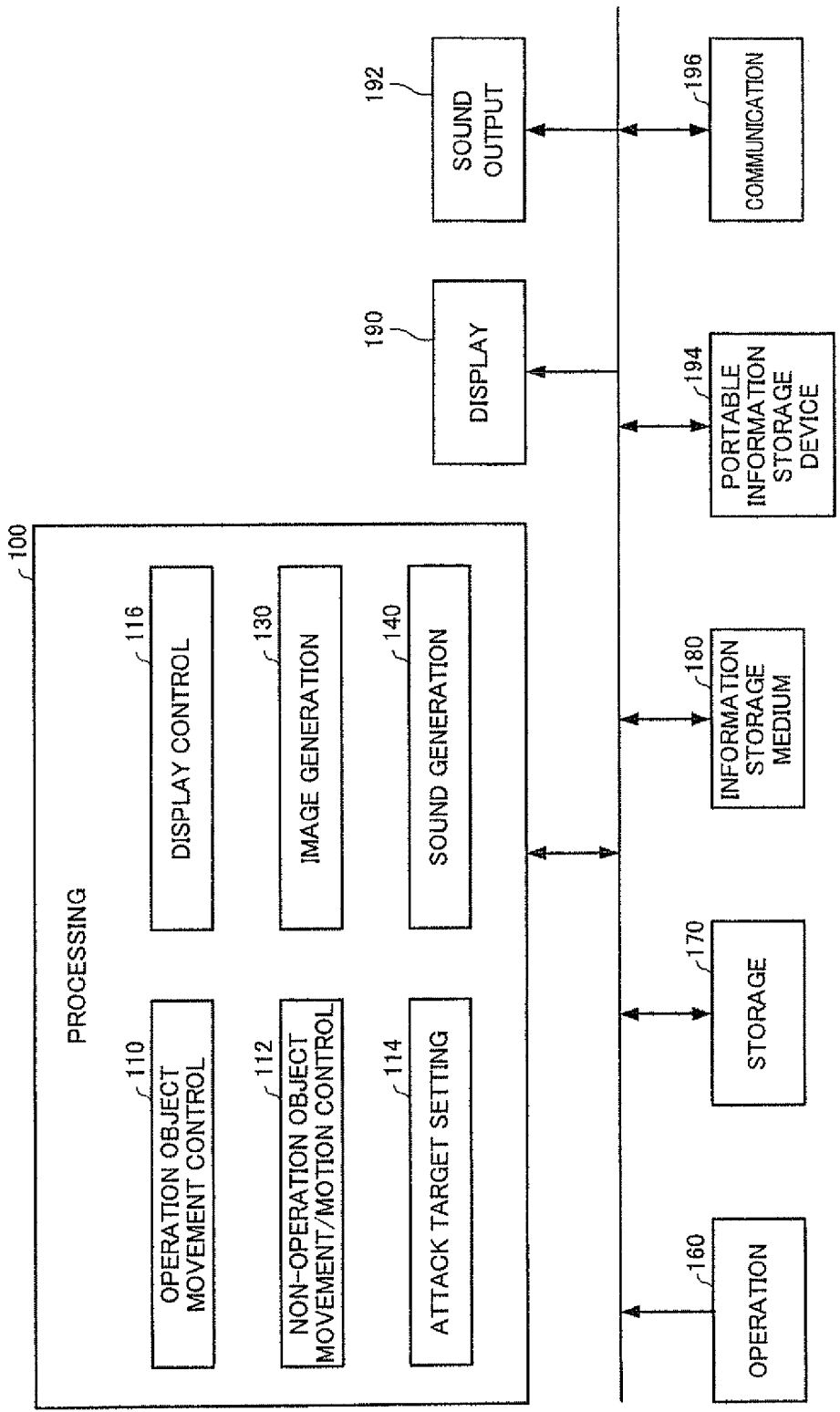
FIG. 1 is a functional block diagram of a game device according to one embodiment of the invention.

The invention may provide a novel match game in which a player's character is set as an attack target that is attacked by a computer-operated non-operation object.

(1) According to one embodiment of the invention, there is provided an information storage medium storing a program that generates an image of a virtual space viewed from a virtual camera, an operation object and a non-operation object being disposed in the virtual space, the program causing a computer to function as:

an operation object movement control section that receives a movement instruction input about the operation object, and controls a movement of the operation object in the virtual space based on the received movement instruction input;

a non-operation object movement/motion control section that controls at least one of a movement and a motion of the non-operation object in the virtual space based on a predetermined algorithm;

an attack target setting section that determines whether or not an attack target tracking condition is satisfied by at least one of the operation object and the non-operation object, and sets the non-operation object to an attack target tracking state in which the non-operation object tracks the operation object as an attack target when it is determined that the attack target tracking condition is satisfied;

a display control section that displays an attack target tracking notification image that indicates that the non-operation object is set to the attack target tracking state when the non-operation object is set to the attack target tracking state; and an image generation section that generates an image of the virtual space viewed from the virtual camera, the operation object being disposed in the virtual space.

According to one embodiment of the invention, there is provided a game device that generates an image of a virtual space viewed from a virtual camera, an operation object and a non-operation object being disposed in the virtual space, the game device comprising:

an operation object movement control section that receives a movement instruction input about the operation object, and controls a movement of the operation object in the virtual space based on the received movement instruction input;

a non-operation object movement/motion control section that controls at least one of a movement and a motion of the non-operation object in the virtual space based on a predetermined algorithm;

an attack target setting section that determines whether or not an attack target tracking condition is satisfied by at least one of the operation object and the non-operation object, and sets the non-operation object to an attack target tracking state in which the non-operation object tracks the operation object as an attack target when it is determined that the attack target tracking condition is satisfied;

a display control section that displays an attack target tracking notification image that indicates that the non-operation object is set to the attack target tracking state when the non-operation object is set to the attack target tracking state; and an image generation section that generates an image of the virtual space viewed from the virtual camera, the operation object being disposed in the virtual space.

According to one embodiment of the invention, there is provided a method of controlling a game device that generates an image of a virtual space viewed from a virtual camera, an operation object and a non-operation object being disposed in the virtual space, the method comprising:

an operation object movement control step that receives a movement instruction input about the operation object, and controls a movement of the operation object in the virtual space based on the received movement instruction input;

a non-operation object movement/motion control step that controls at least one of a movement and a motion of the non-operation object in the virtual space based on a predetermined algorithm;

an attack target setting step that determines whether or not an attack target tracking condition is satisfied by at least one of the operation object and the non-operation object, and sets the non-operation object to an attack target tracking state in which the non-operation object tracks the operation object as an attack target when it is determined that the attack target tracking condition is satisfied;

a display control step that displays an attack target tracking notification image that indicates that the non-operation object is set to the attack target tracking state when the non-operation object is set to the attack target tracking state; and an image generation step that generates an image of the virtual space viewed from the virtual camera, the operation object being disposed in the virtual space.

The term "operation object" refers to an object that is controlled based on an operation input performed by the player.

The term "non-operation object" refers to an object that is automatically controlled by a computer. For example, the non-operation object is an opposing object in a single-player game.

The term "movement/motion" refers to "movement and/or motion".

The attack target setting section may determine whether or not the attack target tracking condition is satisfied by at least one of a predetermined parameter and attribute information relating to at least one of the operation object and the non-operation object.

The predetermined parameter is a variable that may change during the game. The attribute information is information that does not change (is fixed) during the game.

The attack target tracking notification image may be displayed in connection with at least one of the operation object and the non-operation object. For example, the attack target tracking notification image may be an arrow or a line that connects the operation object and the non-operation object. A mark image (e.g., arrow) that indicates the direction or the type of non-operation object may be displayed as the attack target tracking notification image at a position near the operation object.

According to the above embodiment, it is possible to provide a novel match game in which the operation object operated by the player is set as an attack target that is attacked by the non-operation object operated by the computer.

(2) In each of the above-described information storage medium and the game device, the attack target setting section may set the non-operation object to the attack target tracking state on condition that the non-operation object and the operation object are positioned within a field-of-view range of the virtual camera.

(3) In each of the above-described information storage medium and the game device, the image generation section may dispose the virtual camera at a position at which the non-operation object set to the attack target tracking state and the operation object are positioned within a field-of-view range of the virtual camera.

This allows the player to easily determine the opposing (enemy) object from the game image, and enjoy the evasive action.

(4) In each of the above-described information storage medium and the game device, the attack target setting section may set an upper limit to the number of non-operation objects that can be set to the attack target tracking state, and may set a plurality of non-operation objects to the attack target tracking state so that the upper limit is not exceeded.

For example, a priority order may be set based on the attribute information and the level value of the non-operation object, and the non-operation object may be selected until an upper limit N is reached in order from the non-operation object with the highest priority order. The non-operation object may be selected until the upper limit N is reached in order from the non-operation object that is positioned closest to the operation object.

If the number of non-operation objects set to the attack target tracking state increases to a large extent, the operation object cannot easily evade attack by the non-operation object. The above configuration makes it possible to prevent a situation in which the number of non-operation objects set to the attack target tracking state increases to a large extent.

Moreover, it is possible to prevent a situation in which the image becomes intricate due to an increase in the number of attack target tracking notification images along with an increase in the number of non-operation objects set to the attack target tracking state.

(5) In each of the above-described information storage medium and the game device, the display control section may determine a display style of the attack target tracking notification image based on attribute information or a parameter of the non-operation object.

For example, the color, shape, size, length, or width of the attack target tracking notification image may be changed depending on the attribute information or the parameter (e.g., level or strength) of the non-operation object. The player can thus be notified of the degree of danger or the like based on the display style of the attack target tracking notification image.

(6) In each of the above-described information storage medium and the game device, the attack target setting section may determine whether or not the attack target tracking condition is satisfied by at least one of a predetermined parameter and attribute information relating to each of the operation object and a first non-operation object, and may set a second non-operation object that is associated with the first non-operation object to the attack target tracking state when it is determined that the attack target tracking condition is satisfied; and the display control section may display the attack target tracking notification image that indicates that the second non-operation object is set to the attack target tracking state.

In each of the above-described information storage medium and the game device, the attack target setting section may determine whether or not the attack target tracking condition is satisfied by at least one of a predetermined parameter and attribute information relating to each of the operation object and a first non-operation object, and may set the first non-operation object and a second non-operation object that is associated with the first non-operation object to the attack target tracking state when it is determined that the attack target tracking condition is satisfied; and the display control section may display the attack target tracking notification images that respectively indicate that the first non-operation object and the second non-operation object are set to the attack target tracking state.

In this case, the non-operation object (first non-operation object) used to determine whether or not the attack target tracking condition is satisfied may differ from the non-operation object (second non-operation object) associated with the attack target tracking notification image.

For example, objects (e.g., battery and shell) that are initially located at the same position and then separated may be associated as the first object and the second object.

(7) In each of the above-described information storage medium and the game device, the display control section may calculate an optimal movement direction of the operation object based on a positional relationship between the non-operation object set to the attack target tracking state and the operation object, and may display an optimal movement direction notification image that indicates the calculated optimal movement direction.

This makes it possible to indicate an escape route even when the operation object is attacked by a plurality of enemies, so that the player can enjoy the evasive action.

(8) In each of the above-described information storage medium and the game device, the display control section may change a display style of the attack target tracking notification image based on at least one of attribute information and a predetermined parameter relating to each of the non-operation object set to the attack target tracking state and the operation object.

For example, the display control section may determine the degree of damage applied to the operation object based on at least one of the attribute information and the predetermined parameter relating to each of the non-operation object set to the attack target tracking state and the operation object, and may change the display style of the attack target tracking notification image based on the degree of damage applied to the operation object.

(9) In each of the above-described information storage medium and the game device, the display control section may set an upper limit to the number of attack target tracking notification images to be displayed, may select a plurality of non-operation objects based on a predetermined priority standard so that the upper limit is not exceeded, and may display the attack target tracking notification images that indicate that the selected non-operation objects are set to the attack target tracking state.

When the number of non-operation objects set to the attack target tracking state exceeds the upper limit, the attack target tracking notification images that indicate that the unselected non-operation objects are set to the attack target tracking state are not displayed. For example, the non-operation objects for which the attack target tracking notification image is displayed may be selected based on the degree of damage applied to the operation object.

The above configuration makes it possible to prevent a situation in which the image becomes intricate due to an increase in the number of attack target tracking notification images along with an increase in the number of non-operation objects set to the attack target tracking state.

Embodiments of the invention will now be described below. Note that the embodiments described below do not unduly limit the scope of the invention as stated in the claims. Also not all the elements described below should be taken as essential requirements of the invention.

1. Configuration

FIG. 1 illustrates an example of a functional block diagram of a game device according to one embodiment of the invention. Note that it suffices that the game device according to this embodiment illustrated in FIG. 1 include at least a processing section 100 (or the processing section 100 and a storage section 170). The game device according to this embodiment may arbitrarily include sections (functional blocks) other than the processing section 100.

An operation section 160 allows the player to input operation data. The function of the operating section 160 may be implemented by hardware such as a lever, a button, a steering wheel, a shift lever, an accelerator pedal, a brake pedal, a microphone, a sensor, a touch panel, or a casing.

The storage section 170 serves as a work area for the processing section 100, a communication section 196, and the like. The function of the storage section 170 may be implemented by hardware such as a RAM.

An information storage medium 180 (computer-readable medium) stores a program, data, and the like. The function of the information storage medium 180 may be implemented by hardware such as an optical disk (CD, DVD, or Blu-ray Disc), a magneto-optical disk (MO), a magnetic disk, a hard disk, a magnetic tape, or a memory (ROM). The processing section 100 performs various processes according to this embodiment based on a program (data) stored in the information storage medium 180. Specifically, a program that causes a computer to function as each section according to this embodiment (i.e., a program that causes a computer to implement each section) is stored (recorded) in the information storage medium 180.

A display section 190 outputs an image generated according to this embodiment. The function of the display section 190 may be implemented by hardware such as a CRT, an LCD, or a head mount display (HMD). Note that one or two displays may be provided.

A touch panel display may be used as the display section 190 so that the display section 190 functions as an operation section that allows the player to perform an operation input. When the game device includes two displays, one of the displays may be formed using a touch panel display.

A sound output section 192 outputs sound generated according to this embodiment. The function of the sound output section 192 may be implemented by hardware such as a speaker or a headphone.

A portable information storage device 194 stores a player's personal data, game save data, and the like. As the portable information storage device 194, a memory card or the like may be used.

The communication section 196 performs a control process for communicating with a server. The function of the communication section 196 may be implemented by hardware such as a processor or a communication ASIC, a program, or the like.

A program (data) that causes a computer to function as each section according to this embodiment may be distributed to the information storage medium 180 (storage section 170) from an information storage medium included in a server through a network and the communication section 196. Use of the information storage medium included in the server is also included within the scope of the invention.

The processing section 100 (processor) performs various processes such as a game process, an image generation process, or a sound generation process based on operation data from the operation section 160, a program, and the like. In this case, the processing section 100 performs various processes using the storage section 170 as a work area. The function of the processing section 100 may be implemented by hardware such as a processor (e.g., main processor, drawing processor, or DSP) or an ASIC (e.g., gate array), or a program (game program).

The processing section 100 includes an operation object movement control section 110, a non-operation object movement/motion control section 112, an attack target setting section 114, a display control section 116, an image generation section 130, and a sound generation section 140.

The operation object movement control section 110 receives a movement instruction input about an operation object, and controls a movement of the operation object in a virtual space based on the received movement instruction input. The non-operation object movement/motion control section 112 controls at least one of a movement and a motion of a non-operation object in the virtual space based on a predetermined algorithm. The attack target setting section 114 determines whether or not an attack target tracking condition is satisfied by at least one of a predetermined parameter and attribute information relating to at least one of the operation object and the non-operation object, and sets the non-operation object to an attack target tracking state in which the non-operation object tracks the operation object as an attack target when it is determined that the attack target tracking condition is satisfied. The display control section 116 displays an attack target tracking notification image that indicates that the non-operation object is set to the attack target tracking state when the non-operation object is set to the attack target tracking state.

The attack target setting section 114 may set the non-operation object to the attack target tracking state on condition that the non-operation object and the operation object are positioned within a field-of-view range of a virtual camera.

The attack target setting section 114 may set an upper limit to the number of non-operation objects that can be set to the attack target tracking state, and set a plurality of non-operation objects to the attack target tracking state so that the upper limit is not exceeded.

The display control section 116 may determine a display style of the attack target tracking notification image based on the attribute information or the parameter of the non-operation object.

The attack target setting section 114 may determine whether or not the attack target tracking condition is satisfied by at least one of the predetermined parameter and the attribute information relating to each of the operation object and a first non-operation object, and may set a second non-operation object that is associated with the first non-operation object to the attack target tracking state when it is determined that the attack target tracking condition is satisfied, and the display control section 116 may display the attack target tracking notification image that indicates that the second non-operation object is set to the attack target tracking state.

The display control section 116 may calculate an optimal movement direction of the operation object based on the positional relationship between the non-operation object set to the attack target tracking state and the operation object, and may display an optimal movement direction notification image that indicates the calculated optimal movement direction.

The display control section 116 may change the display style of the attack target tracking notification image based on at least one of the attribute information and the predetermined parameter relating to each of the non-operation object set to the attack target tracking state and the operation object.

The display control section 116 may set an upper limit to the number of attack target tracking notification images to be displayed, may select a plurality of non-operation objects based on a predetermined priority standard so that the upper limit is not exceeded, and may display attack target tracking notification images that indicate that the selected non-operation objects are set to the attack target tracking state.

The image generation section 130 generates an image of the virtual space viewed from the virtual camera, the operation object being disposed in the virtual space. The image generation section 130 may dispose the virtual camera at a position at which the non-operation object set to the attack target tracking state and the operation object are positioned within the field-of-view range of the virtual camera.

The image generation section 130 performs a drawing process based on the results of various processes (game process) performed by the processing section 100, and outputs the generated image to the display section 190. In this case, the image generated by the image generation section 130 may be a three-dimensional image.

The sound generation section 140 performs a sound process based on the results of various processes performed by the processing section 100 to generate game sound such as background music (BGM), effect sound, or voice, and outputs the generated game sound to the sound output section 192.

2. Method According to this Embodiment

A method according to this embodiment is described below with reference to the drawings.

2-1. Game Image

The method according to this embodiment is described in detail below. In this embodiment, a character object that moves/makes a motion based on an operation input performed by the player is referred to as "operation object". The following description is given taking an example of a game in which the player causes the operation object to move in a game space and fight against a non-operation object.

Figure 2:
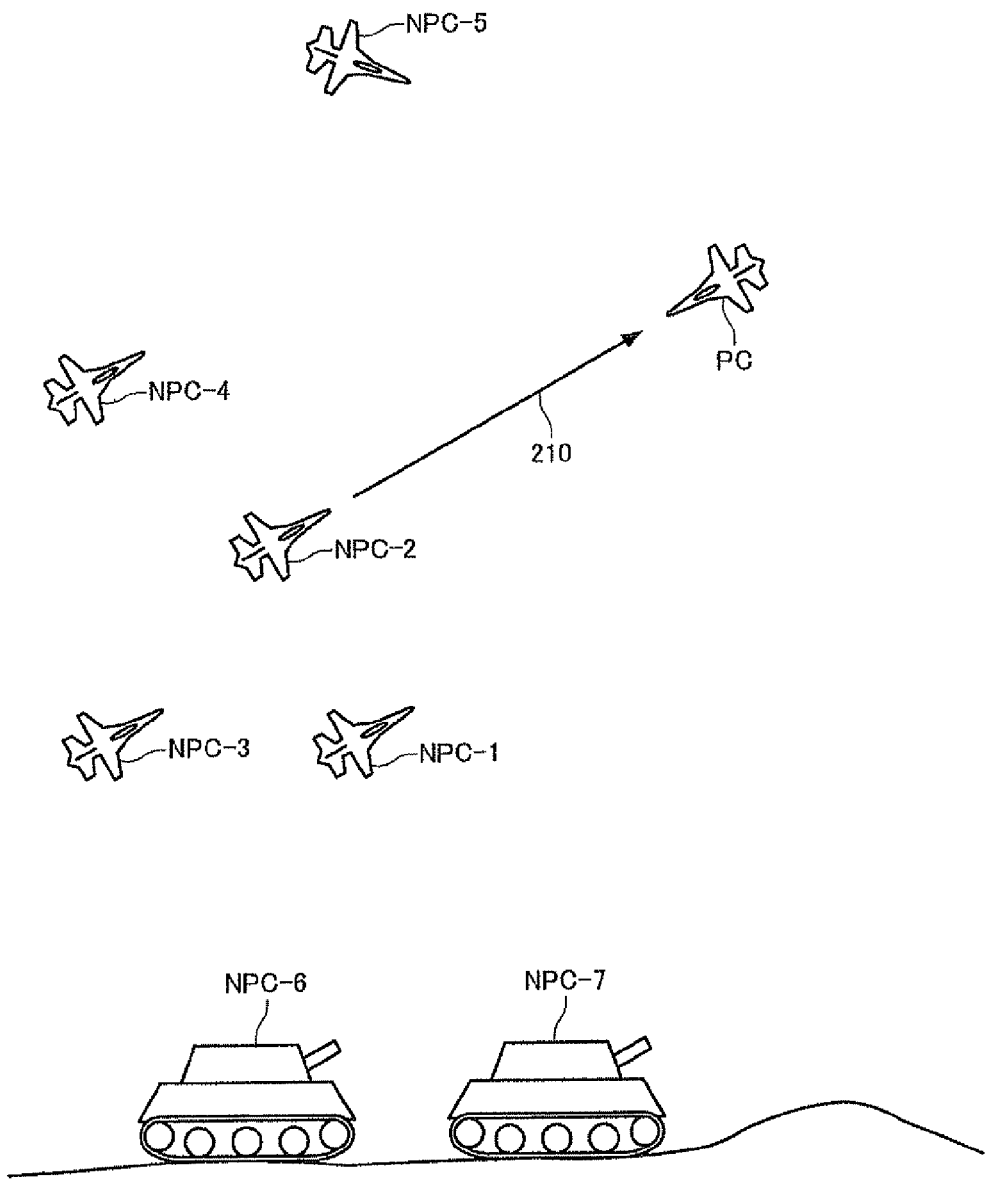
FIG. 2 illustrates an example of a game image generated according to one embodiment of the invention.

FIG. 2 illustrates an example of a game image generated according to this embodiment.

In this embodiment, an image that shows the game space viewed from a given viewpoint (virtual camera) is displayed as the game image, an operation object PC and one or more non-operation objects NPC-1 to NPC-7 being disposed in the game space.

The player causes the operation object PC to move in the game space or attack the non-operation objects NPC-1 to NPC-7 by operating the operation section. The term "non-operation object" refers to an object of which the movement and the motion in the virtual space are controlled by the game device (computer) based on a predetermined algorithm irrespective of the operation input performed by the player. For example, when the player plays a match with the computer, the object controlled by the computer is the non-operation object.

In this embodiment, whether or not a lock-on condition (example of the attack target tracking condition) is satisfied by at least one of a predetermined parameter and attribute information relating to each of the operation object and the non-operation object is determined, and the non-operation object is set to a lock-on state (example of the attack target tracking state) in which the non-operation object locks on the operation object when it is determined that the lock-on condition is satisfied. A lock-on notification image (example of the attack target tracking notification image) 210 that indicates that the non-operation object is set to the lock-on state is displayed when the non-operation object is set to the lock-on state.

When the lock-on notification image is displayed on the screen, the player can perform a game operation while recognizing that the operation object may be attacked by an enemy (non-operation object), and determining the position and the direction of the enemy that locks on the operation object.

Figure 3:
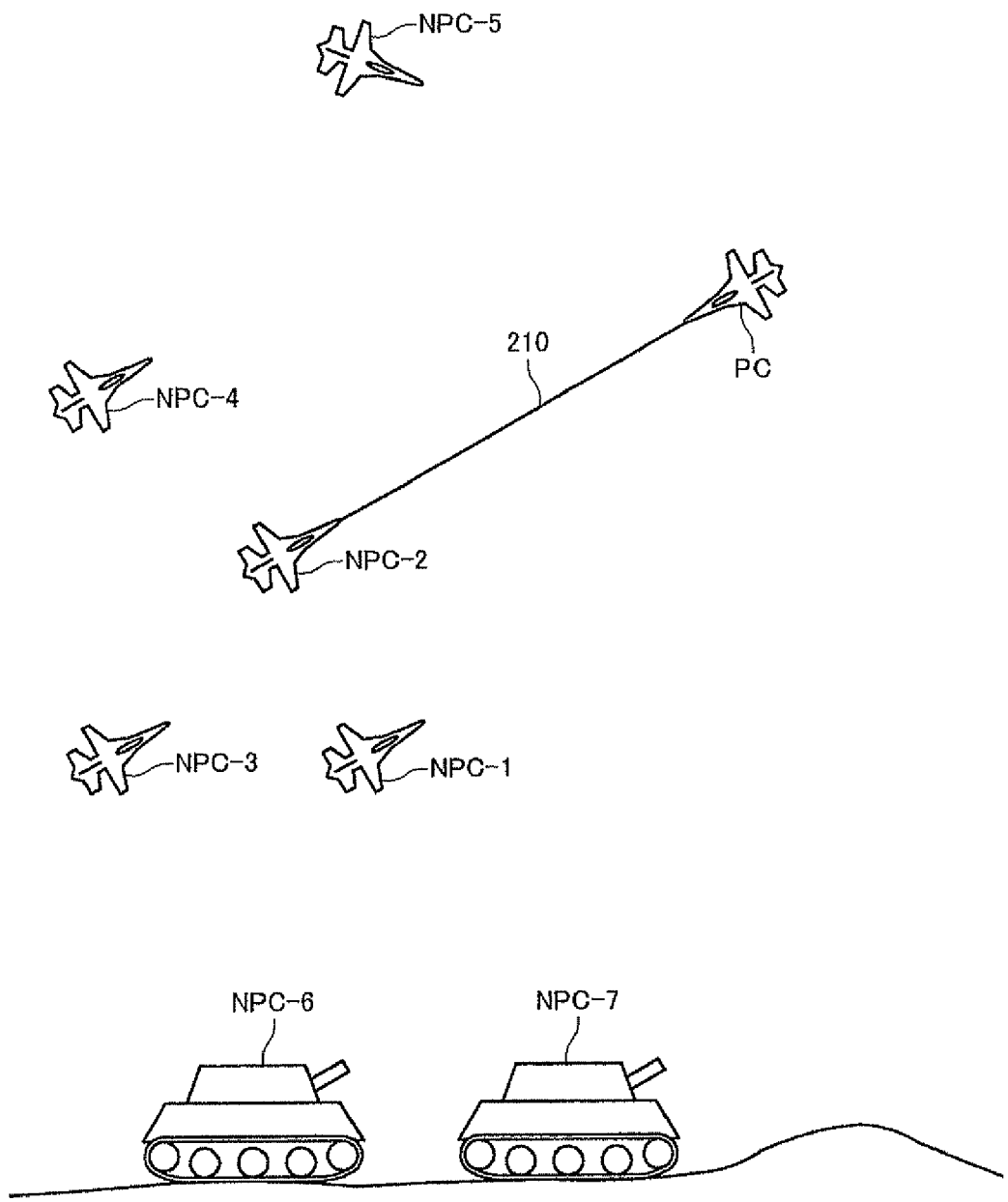
FIG. 3 illustrates an example of a game image generated according to one embodiment of the invention.

In FIG. 2, since the non-operation object NPC-2 satisfies the lock-on condition and is set to the lock-on state, the lock-on notification image 210 is displayed. As illustrated in FIG. 2, the lock-on notification image 210 may be an arrow that links the non-operation object NPC-2 set to the lock-on state to the operation object PC. As illustrated in FIG. 3, the lock-on notification image 210 may be a line segment or the like that links the non-operation object NPC-2 set to the lock-on state to the operation object PC. This allows the player to easily determine the positional relationship between the non-operation object set to the lock-on state and the operation object from the game image.

Figure 4:
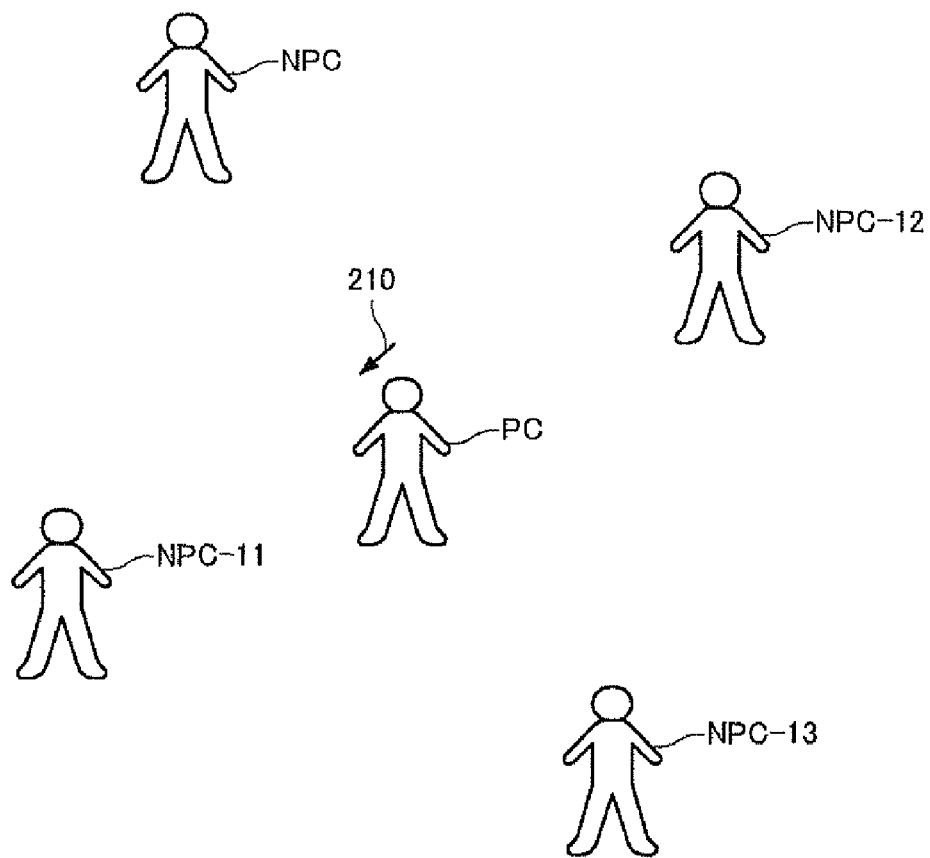
FIG. 4 illustrates an example of a game image generated according to one embodiment of the invention.
Figure 5:
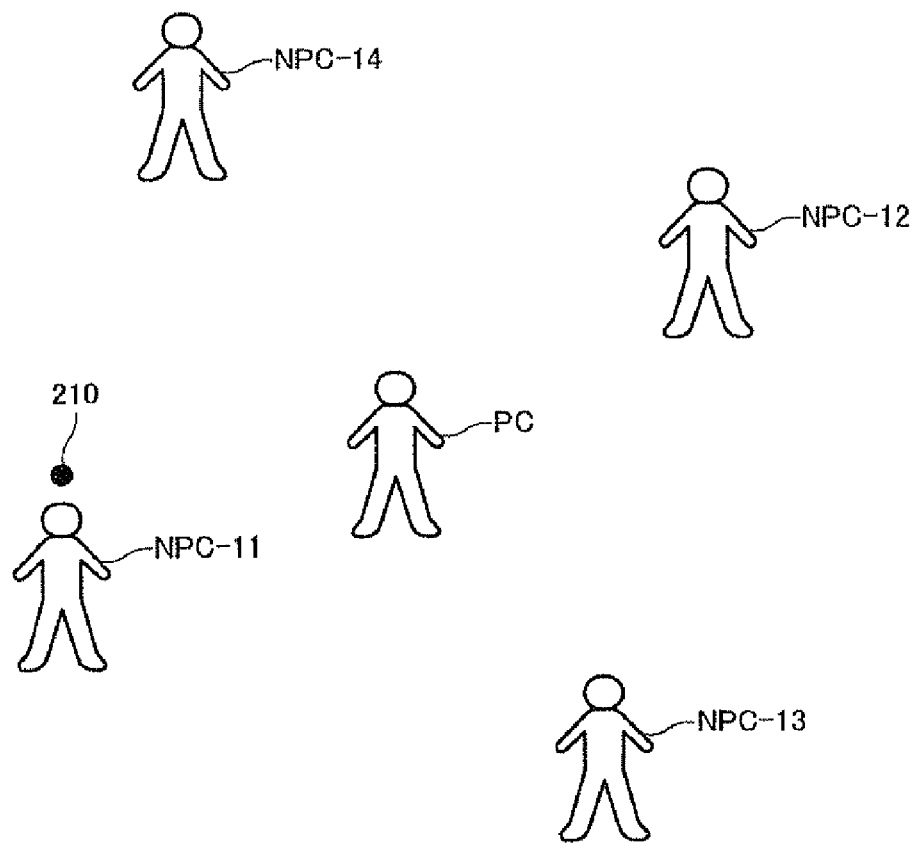
FIG. 5 illustrates an example of a game image generated according to one embodiment of the invention.

As illustrated in FIG. 4, a mark that indicates the non-operation object NPC-11 set to the lock-on state (an arrow image that indicates the direction of the non-operation object NPC-11 in the example illustrated in FIG. 4) may be displayed near the operation object PC as the lock-on notification image 210. As illustrated in FIG. 5, a mark that specifies the non-operation object set to the lock-on state may be displayed near the non-operation object NPC-11 as the lock-on notification image 210. This makes it possible to display a compact lock-on notification image 210 to prevent a situation in which the game image becomes intricate.

The lock-on notification image (example of the attack target tracking notification image) 210 may be drawn on a two-dimensional image obtained by perspective projection transformation. The lock-on notification image 210 may be disposed in the virtual three-dimensional space as an object in the same manner as the operation object and the non-operation object.

The lock-on notification image 210 may be generated at a timing at which the non-operation object is set to the lock-on state (example of the attack target tracking state). The lock-on notification image 210 may be continuously displayed when the non-operation object is set to the lock-on state, or may be caused to disappear when a given period of time has elapsed even if when the non-operation object is set to the lock-on state. The lock-on notification image 210 may be caused to disappear when the non-operation object has attacked the operation object.

2-2. Game Parameter

FIG. 15 illustrates an example of parameters set for the non-operation object according to this embodiment.

In this embodiment, parameters such as position coordinates 420, a direction 430, a level value 440, and a lock-on flag 450 of the non-operation object are set corresponding to a non-operation object ID 410 that identifies the non-operation object.

The position coordinates 420 may be x, y, z coordinates of a representative point of the non-operation object in a world coordinate system of the game space, for example. The direction 430 may be the value of rotation of the non-operation object around the X-axis, Y-axis, or Z-axis in the world coordinate system of the game space. The level value 440 indicates the level value set for the non-operation object. The lock-on flag 450 is a flag that indicates that the non-operation object locks on the operation object.

2-3. Non-Operation Object Lock-on Process

In this embodiment, whether or not the lock-on condition (attack target tracking condition) is satisfied by the non-operation object and the operation object is determined irrespective of the operation input performed by the player, and the non-operation object is set to the lock-on state when the lock-on condition is satisfied. The non-operation object set to the lock-on state attacks the operation object PC (i.e., attack target). For example, when the non-operation object is a fighter aircraft (see FIGS. 2 and 3), the non-operation object may fire at the operation object. When the non-operation object set to the lock-on state fires at the operation object, the operation object is damaged if the operation object does not take evasive action (e.g., moves, attacks the enemy (non-operation object), or stops in order to avoid the attack).

When the non-operation object is a robot or a character (see FIGS. 4 and 5), the non-operation object may move toward and attack the operation object. When the non-operation object set to the lock-on state attacks the operation object, the operation object is hit if the operation object does not move to evade the non-operation object.

When the non-operation object is a robot or a character (see FIGS. 4 and 5), the non-operation object may make an attack motion when the lock-on condition (attack target tracking condition) is satisfied. Since the non-operation object makes an attack motion over several frames, a period in which the lock-on condition (attack target tracking condition) is not satisfied may occur during the attack motion. The non-operation object continuously makes an attack motion even when a period in which the lock-on condition is not satisfied occurs. In this case, an image that shows a state in which the non-operation object has missed the operation object is displayed.

2-4. Attack Target Tracking State (Lock-on State) Setting Process

In this embodiment, whether or not the attack target tracking condition is satisfied by at least one of the predetermined parameter and the attribute information relating to each of the operation object and the non-operation object is determined, and the non-operation object is set to the attack target tracking state (lock-on state) in which the non-operation object tracks the operation object as an attack target when it is determined that the attack target tracking condition is satisfied.

The predetermined parameter is a variable that may change during the game. Examples of the predetermined parameter include position information and the direction of the operation object or the non-operation object, a level value, a strength value, and a life value that may change during the game depending on the game state, and the like. The attribute information is information that does not change (is fixed) during the game. Examples of the attribute information include type information about the operation object or the non-operation object, a level value that is fixed, and the like.

Figure 6:
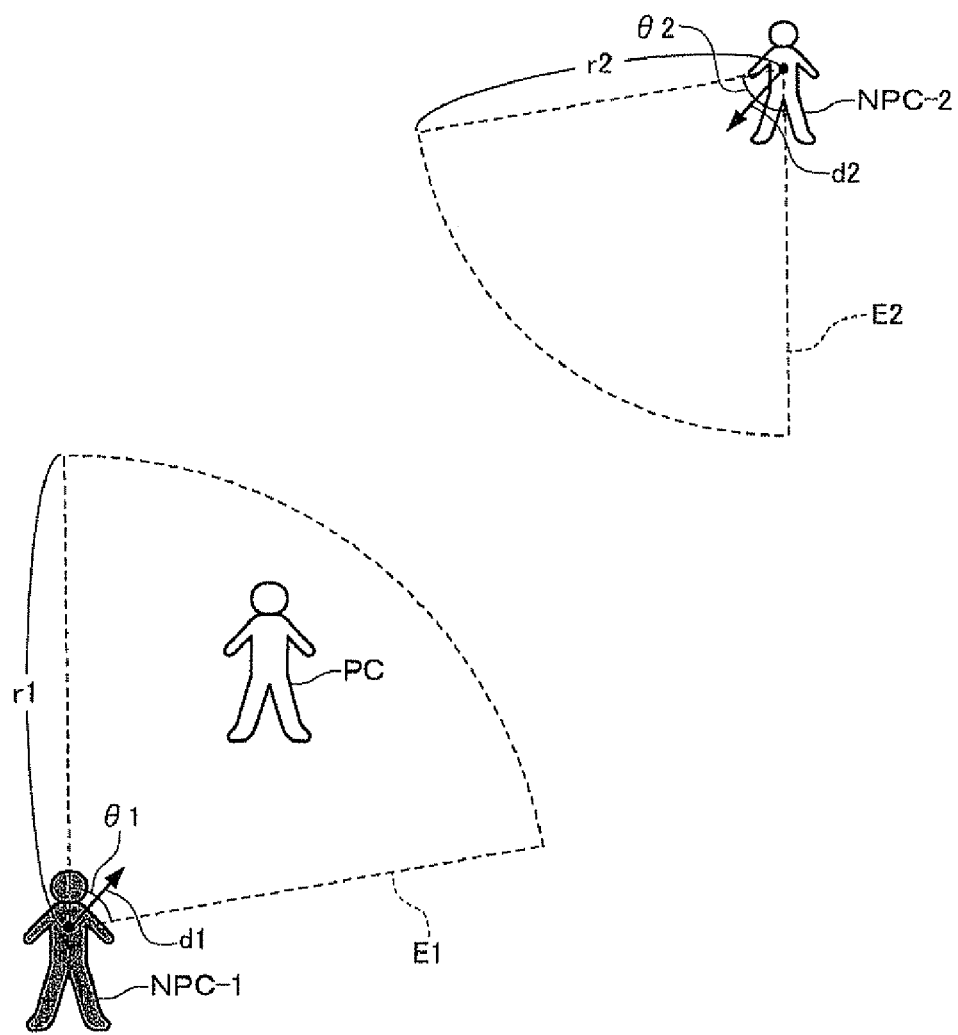
FIG. 6 is a diagram illustrating a lock-on state setting process.

FIG. 6 is a diagram illustrating a lock-on state (example of the attack target tracking state) setting process.

In this embodiment, the operation object PC and a plurality of non-operation objects including the non-operation object NPC-1 and the non-operation object NPC-2 are provided in the game space. The attack target tracking condition may be a condition concerning the position coordinates (example of a predetermined parameter) of the operation object and placement information such as position coordinates and a direction (examples of a predetermined parameter) about the non-operation object.

The attack target tracking condition may be set for each non-operation object. For example, a lock-on range may be set for each non-operation object as the attack target tracking condition, and whether or not the non-operation object is positioned within the lock-on range (whether or not a predetermined component of the position coordinates is included within the lock-on range) may be determined.

The attack target tracking condition may be set for the operation object. For example, a lock-on range may be set around the operation object, and a non-operation object that is positioned within the lock-on range may set to the attack target tracking state.

As illustrated in FIG. 6, a fan-shaped area E1 having a radius of r1 and a center angle of theta1 may be set in a direction dl (determined depending on the non-operation object NPC-1) of the non-operation object NPC-1 as the lock-on range, and the non-operation object NPC-1 may be set to the lock-on state when the position coordinates of the operation object PC are included within the lock-on range. When the object inside the game space mainly moves or makes a motion on the ground (XZ plane), the lock-on range may be set to be a two-dimensional area in the XZ plane. In this case, whether or not the position coordinates of the operation object PC in the XZ plane are included within the lock-on range may be determined.

When the object inside the game space moves or makes a motion three-dimensionally (e.g., fighter aircraft game), a three-dimensional lock-on range may be set, and whether or not the position coordinates of the operation object PC in the XYZ plane are included within the lock-on range may be determined.

In FIG. 6, E1 and E2 indicate the lock-on ranges of the non-operation objects NPC-1 and NPC-2, respectively. The non-operation object NPC-1 or NPC-2 is set to the lock-on state when the operation object PC is positioned within the lock-on range indicated by E1 or E2. The lock-on range may be set for each non-operation object. The shape and the size of the lock-on range of each non-operation object may be set based on the parameter and the attribute information of each non-operation object. For example, the lock-on range of the non-operation object with a high level value may be set so that the area or the volume of the lock-on range is larger than that of the lock-on range of the non-operation object with a low level value.

In FIG. 6, the lock-on range E1 is set for the non-operation object NPC-1, and the lock-on range E2 is set for the non-operation object NPC-2. When the level value of the non-operation object NPC-1 is "3" and the level value of the non-operation object NPC-2 is "2", the lock-on range E1 of the non-operation object NPC-1 and the lock-on range E2 of the non-operation object NPC-2 may be set so that the radius r1 of the lock-on range E1 of the non-operation object NPC-1 is larger than the radius r2 of the lock-on range E2 of the non-operation object NPC-2.

In FIG. 6, since the operation object PC is positioned within the lock-on range E1 of the non-operation object NPC-1, the non-operation object NPC-1 is set to the lock-on state. Since the operation object PC is not positioned within the lock-on range E2 of the non-operation object NPC-2, the non-operation object NPC-2 is not set to the lock-on state.

Note that whether or not to set the non-operation object to the lock-on state may be determined based on level information (example of a predetermined parameter) in addition to the position coordinates of the operation object and the placement information (position information and direction) about the non-operation object. For example, the non-operation object may be set to the lock-on state when the distance between the position coordinates of the operation object and the non-operation object is within a predetermined range and the level value (example of a predetermined parameter) of the operation object is smaller than the level value (example of a predetermined parameter) of the non-operation object.

In this case, the lock-on range may be set for the operation object, the non-operation object that is positioned within the lock-on range may be extracted, and the extracted non-operation object may be set to the lock-on state.

Whether or not to set the non-operation object to the lock-on state may be determined based on the attribute information (information that is set as a fixed value) in addition to the parameters (variables) of the operation object and the non-operation object. For example, a superiority/inferiority relationship may be set in advance between the attribute information about the operation object and the attribute information about the non-operation object. The non-operation object may be set to the lock-on state when the distance between the position coordinates of the operation object and the non-operation object is within a predetermined range and the attribute information about the operation object is lower in superiority than the attribute information about the non-operation object.

Figure 7:
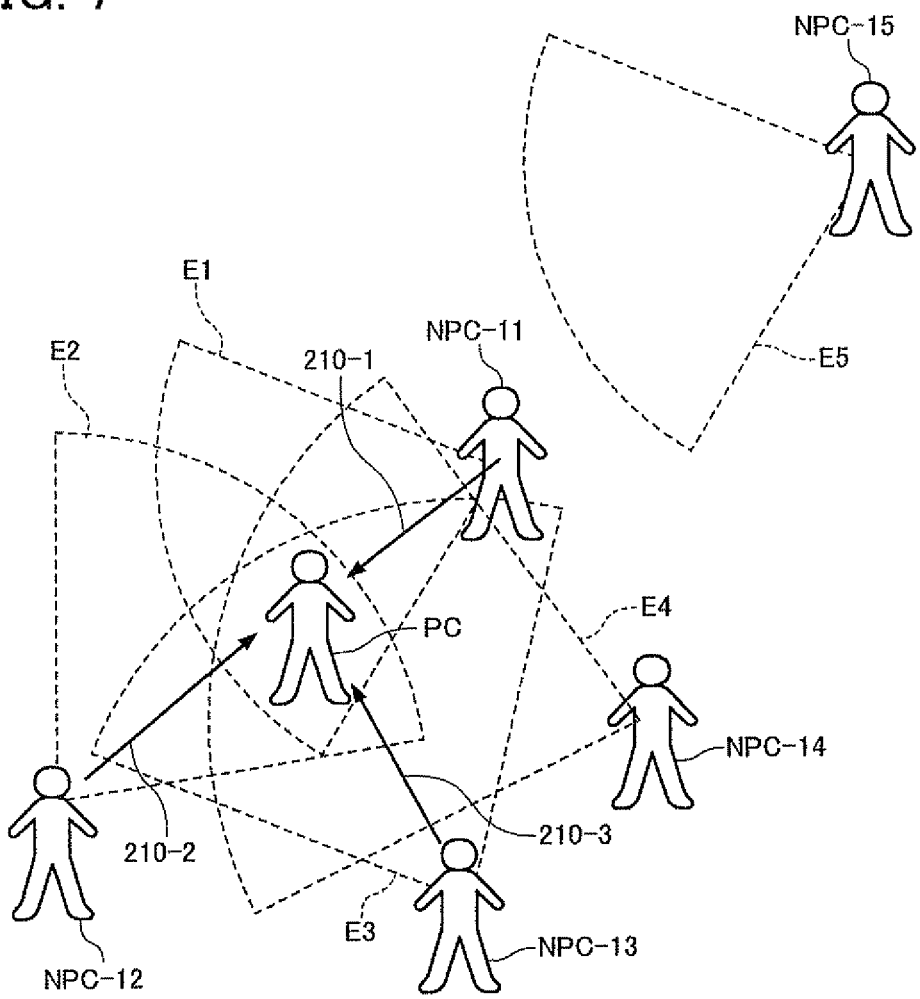
FIG. 7 is a diagram illustrating a process of setting a plurality of non-operation objects to a lock-on state.

FIG. 7 is a diagram illustrating a method of limiting the number of non-operation objects that can be set to the lock-on state.

The following description is given taking an example in which the operation object PC and the non-operation objects NPC-11 to NPC-16 are provided in the game space. Lock-on ranges E1 to E6 are set respectively for the non-operation objects NPC-11 to NPC-16. The position coordinates of the operation object PC are included within the lock-on ranges E1 to E4 of the non-operation objects NPC-11 to NPC-14.

When a plurality of non-operation objects can be set to the lock-on state, an upper limit may be set to the number of non-operation objects that can be set to the lock-on state, and a plurality of non-operation objects may be set to the lock-on state so that the upper limit is not exceeded. For example, when the upper limit of the number of non-operation objects that can be set to the lock-on state is "3", three non-operation objects may be selected from the non-operation objects NPC-11 to NPC-14 corresponding to the lock-on ranges E1 to E4 either randomly or based on a predetermined standard, and set to the attack target tracking state. In FIG. 7, the non-operation objects NPC-11 to NPC-13 corresponding to the lock-on range E1 to E3 are selected, for example. Lock-on notification images 210-1 to 210-3 are displayed corresponding to the selected non-operation objects NPC-11 to NPC-13.

The non-selected non-operation object NPC-14 is not set to the lock-on state, and a lock-on notification image is not displayed corresponding to the non-operation object NPC-14.

For example, a priority order may be set based on the attribute information and the level value of the non-operation object, and the non-operation object may be selected until an upper limit N is reached in order from the non-operation object with the highest priority order. The non-operation object may be selected until the upper limit N is reached in order from the non-operation object that is positioned closest to the operation object. This makes it possible to prevent a situation in which the number of non-operation objects set to the attack target tracking state increases to a large extent, so that the player can easily evade attack by the non-operation object.

Moreover, it is possible to prevent a situation in which the image becomes intricate due to an increase in the number of attack target tracking notification images along with an increase in the number of non-operation objects set to the attack target tracking state.

The attack target tracking condition may be fixed, or may be variably set.

The non-operation object may be set to the attack target tracking state on condition that the non-operation object and the operation object are positioned within the field-of-view range of the virtual camera. For example, the non-operation objects that are positioned within the field-of-view range of the virtual camera may be extracted, and the non-operation object set to the lock-on state is determined from the extracted non-operation objects.

2-5. Lock-on Display Style

Figure 8:
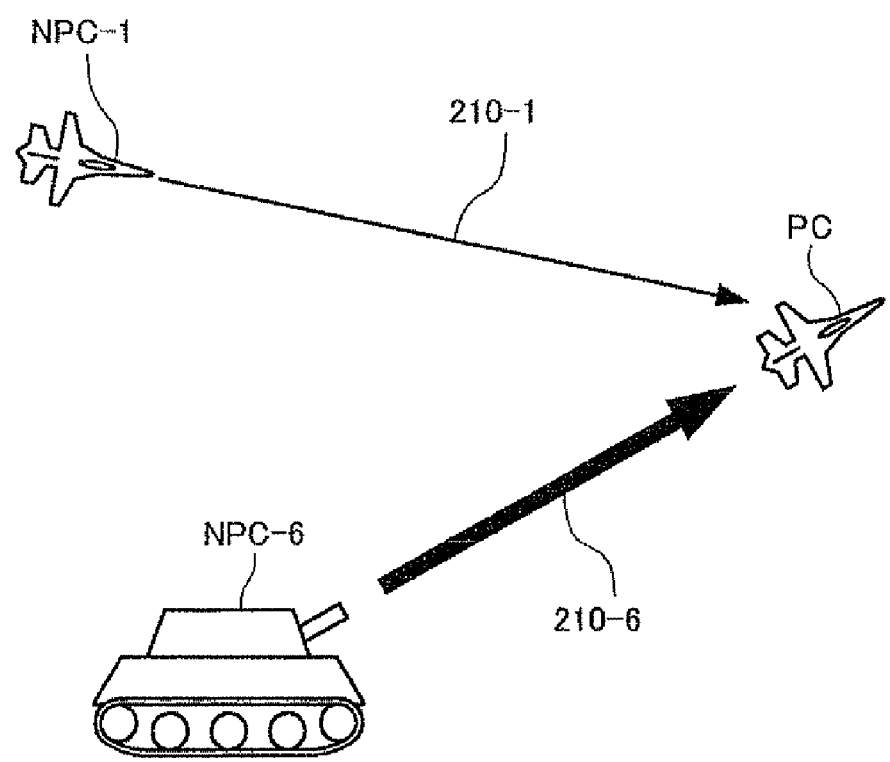
FIG. 8 is a diagram illustrating attribute information about a non-operation object and a display style of a lock-on notification image.

FIG. 8 is a diagram illustrating the attribute information about the non-operation object and the display style of the lock-on notification image.

The non-operation object NPC-6 is a tank (i.e., the attribute is a tank), and the non-operation object NPC-1 is a fighter aircraft (i.e., the attribute is a fighter aircraft). When the destructive power of the tank is higher than that of the fighter aircraft, the lock-on notification image 210-6 of the non-operation object NPC-6 having a destructive power higher than that of the non-operation object NPC-1 may be set to be wider than the lock-on notification image 210-1 of the non-operation object NPC-1, for example. The lock-on notification image may be changed depending on the degree of danger.

The player can thus be notified of the destructive power, the degree of danger, or the like of the enemy (non-operation object) from the display style of the attack target tracking notification image.

Figure 9:
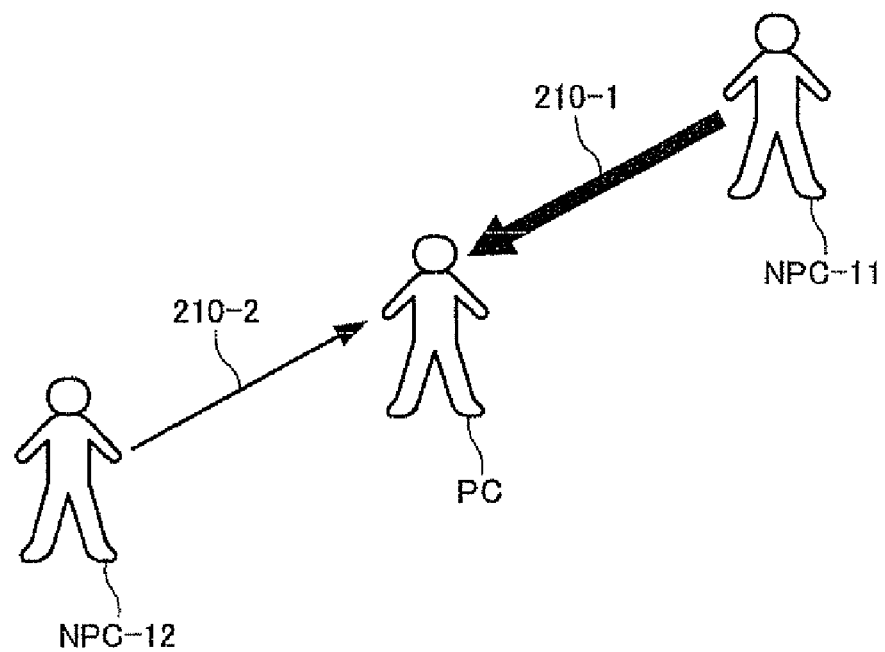
FIG. 9 is a diagram illustrating the level or strength value (examples of parameter) of a non-operation object and a display style of a lock-on notification image.

FIG. 9 is a diagram illustrating the level or strength value (examples of a parameter) of the non-operation object and the display style of the lock-on notification image.

The level or strength value of the non-operation object NPC-11 is "5", and the level or strength value of the non-operation object NPC-12 is "2". In this case, the lock-on notification image 210-1 of the non-operation object NPC-11 having a level or a strength value higher than that of the non-operation object NPC-12 may be set to be wider than the lock-on notification image 210-2 of the non-operation object NPC-12. The lock-on notification image may also be changed depending on the degree of danger.

Figure 10:
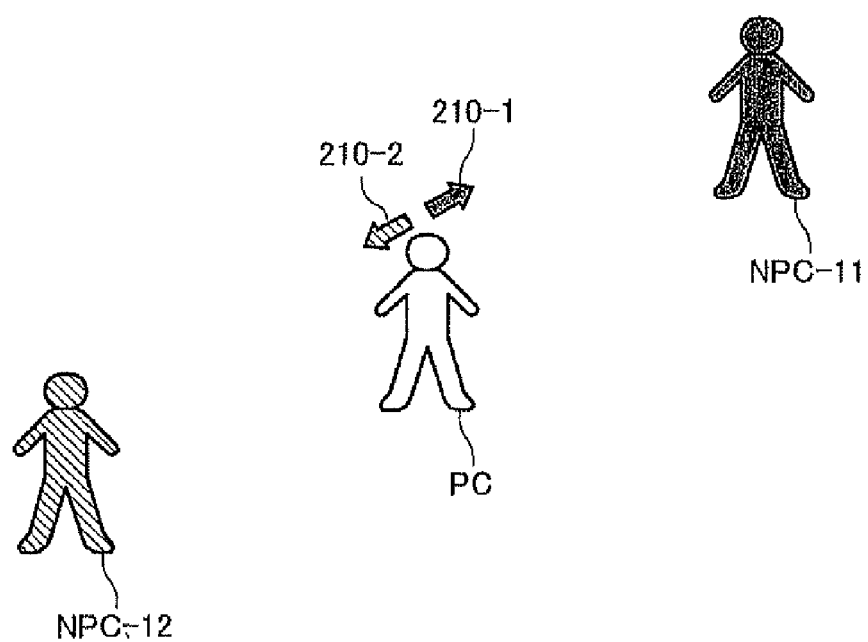
FIG. 10 is a diagram illustrating the type of non-operation object and a display style of a lock-on notification image.

FIG. 10 is a diagram illustrating the type of non-operation object and the display style of the lock-on notification image.

The type of the non-operation object NPC-11 is a black team, and the type of the non-operation object NPC-12 is a red team. In this case, the lock-on notification image 210-1 of the non-operation object NPC-12 and the lock-on notification image 210-2 of the non-operation object NPC-2 may be displayed in colors corresponding to the types of the non-operation objects. For example, the lock-on notification image 210-1 of the non-operation object NPC-11 may be displayed in black (i.e., the color corresponding to the type "black team"), and the lock-on notification image 210-2 of the non-operation object NPC-12 may be displayed in red (i.e., the color corresponding to the type "red team"). This allows the player to be intuitively reminded of the team to which the non-operation object belongs from the color of the lock-on notification image. This makes it possible to display a compact lock-on notification image to prevent a situation in which the game image (screen) becomes intricate.

2-6. Virtual Camera Placement Control Process

Figure 11A:
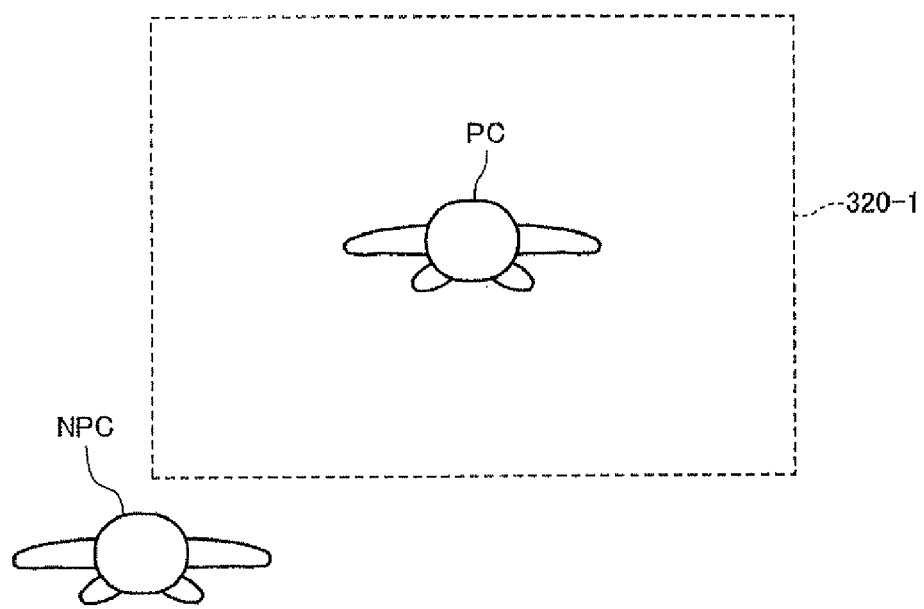
FIGS. 11A and 11B are diagrams illustrating virtual camera placement control.
Figure 11B:
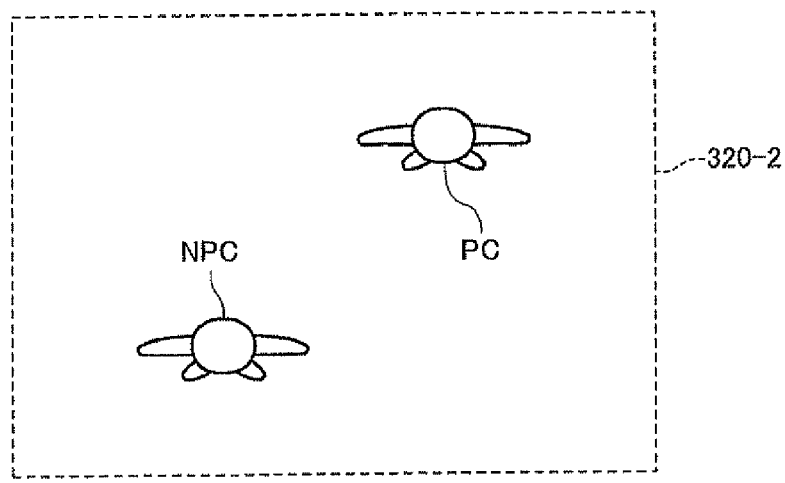
Figure 12A:
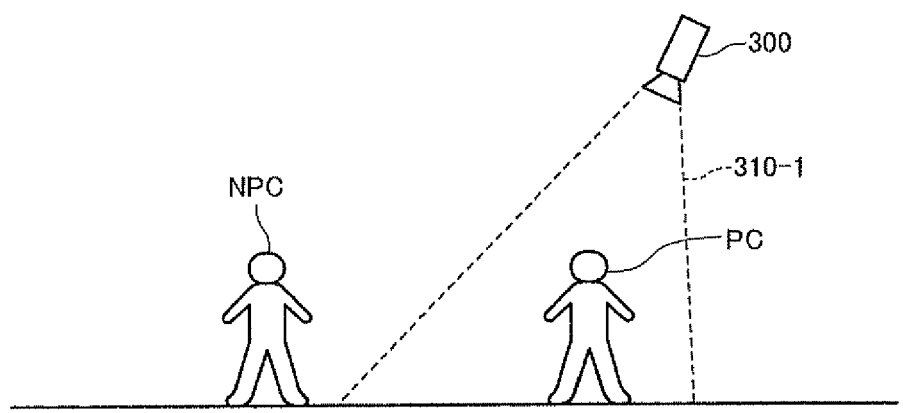
FIGS. 12A and 12B are diagrams illustrating virtual camera placement control.
Figure 12B:
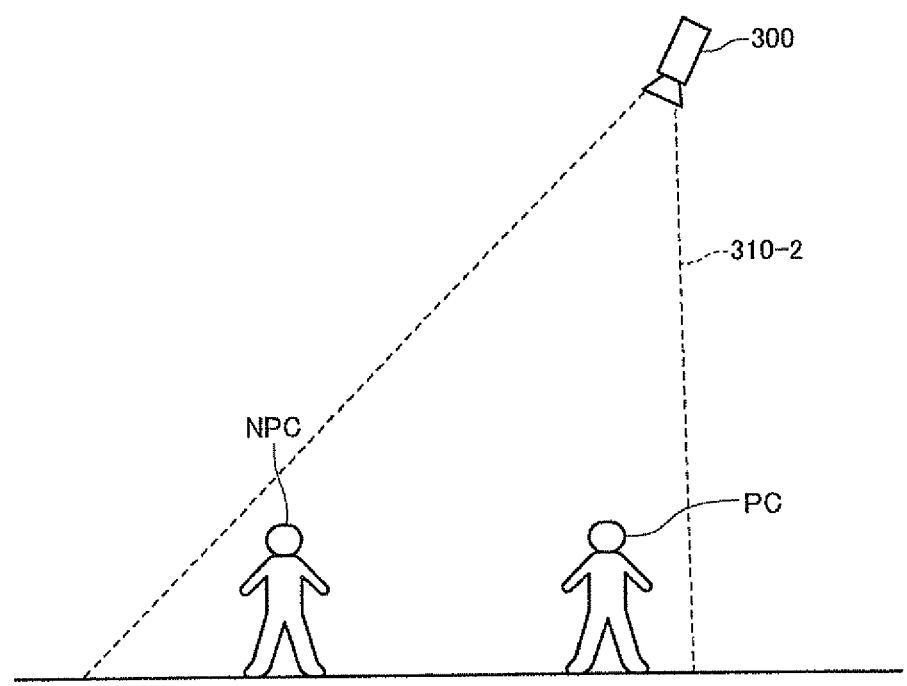

FIGS. 11A, 11B, 12A, and 12B are diagrams illustrating a virtual camera placement control process. FIG. 11A illustrates a game image before the non-operation object NPC is set to the lock-on state, and FIG. 12A illustrates a game image after the non-operation object NPC is set to the lock-on state. FIG. 12A illustrates the placement state of the virtual camera in the game space illustrated in FIG. 11A, and FIG. 12B illustrates the placement state of the virtual camera in the game space illustrated in FIG. 11B. In FIG. 12A, only the operation object PC is positioned within a field-of-view range 310-1 of a virtual camera 300. Therefore, only the operation object PC is displayed on a game screen 320-1 (i.e., the non-operation object NPC is not displayed) (see FIG. 11A).

When the non-operation object is set to the lock-on state, the virtual camera moves to a higher overhead position (i.e., a position apart from the operation object) (see FIG. 12B). Therefore, the operation object PC and the non-operation object NPC are positioned within a field-of-view range 310-2 of the virtual camera 300, and the operation object PC and the non-operation object NPC are displayed on a game screen 320-2 (see FIG. 11B).

Specifically, since the position of the virtual camera is controlled so that the non-operation object NPC and the operation object PC are displayed within the game image when the non-operation object NPC is set to the lock-on state (example of the attack target tracking state), the player can determine the position of the non-operation object set to the lock-on state NPC from the game image, and easily evade attack by the non-operation object NPC.

For example, when generating a game image using the virtual camera from a first person point of view, the virtual camera may be changed to a third person point of view when the non-operation object is set to the lock-on state. This allows the player to easily determine the positional relationship between the operation object and the non-operation object, and easily evade attack by the non-operation object set to the lock-on state.

When generating a game image using the virtual camera from a first person point of view, the position of the virtual camera may be controlled so that the non-operation object is positioned within the field-of-view range of the virtual camera when the non-operation object is set to the lock-on state. This allows the player to determine the position of the non-operation object set to the lock-on state from the game image, and easily evade attack by the non-operation object.

2-7. Process Performed when Lock-on Condition Determination Target Differs from Lock-on Display Target FIGS. 13A and 13B are diagrams illustrating a process performed when the lock-on condition determination target (non-operation object) differs from the lock-on notification image display target (non-operation object).

Whether or not the lock-on condition (example of the attack target tracking condition) is satisfied by at least one of the predetermined parameter and the attribute information relating to each of the operation object PC and a first non-operation object NPC-P may be determined, and the first non-operation object NPC-P and a second non-operation object NPC-C that is associated with the first non-operation object NPC-P may be set to the lock-on state when it is determined that the lock-on condition is satisfied. For example, the first non-operation object NPC-P may be a missile tank, and the second non-operation object NPC-C may be a missile launched from the battery of the tank. In this case, the first non-operation object NPC-P (tank) and the second non-operation object NPC-C (missile launched from the battery of the tank) may be set to the lock-on state based on the positional relationship between the first non-operation object NPC-P and the operation object PC.

Figure 13A:
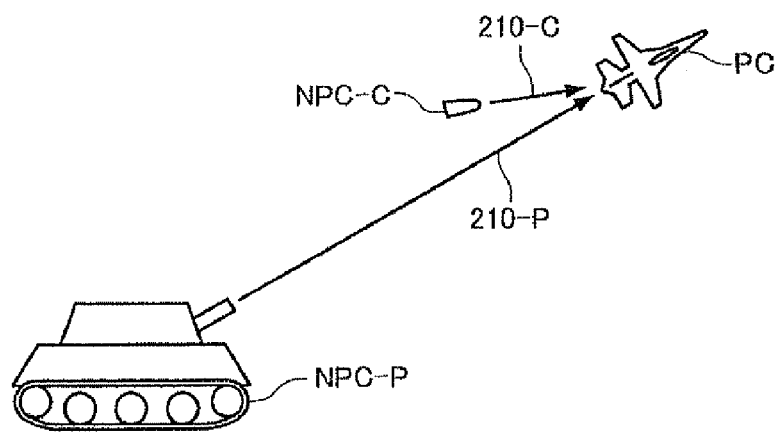
FIGS. 13A and 13B are diagrams illustrating a process performed when a lock-on condition determination target differs from a lock-on display target.
Figure 13B:
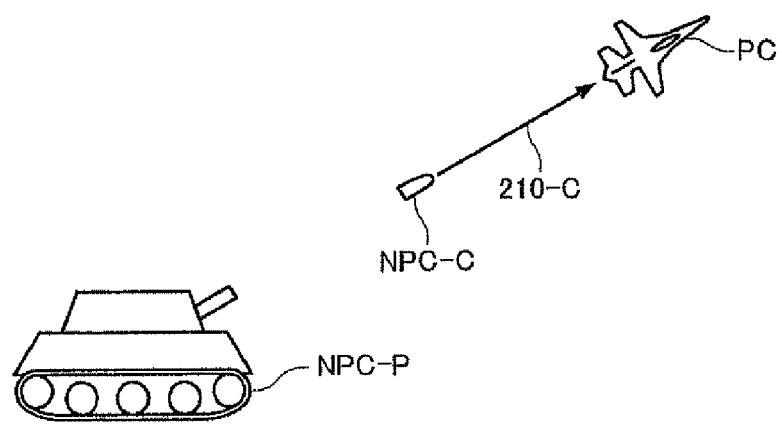

As illustrated in FIG. 13A, a lock-on notification image 210-P corresponding to the first non-operation object NPC-P and a lock-on notification image 210-C corresponding to the second non-operation object NPC-C may be displayed. Alternatively, only the lock-on notification image 210-C corresponding to the second non-operation object NPC-C may be displayed, as illustrated in FIG. 13B.

2-8. Optimal Movement Direction Notification Image Display Control Process

Figure 14:
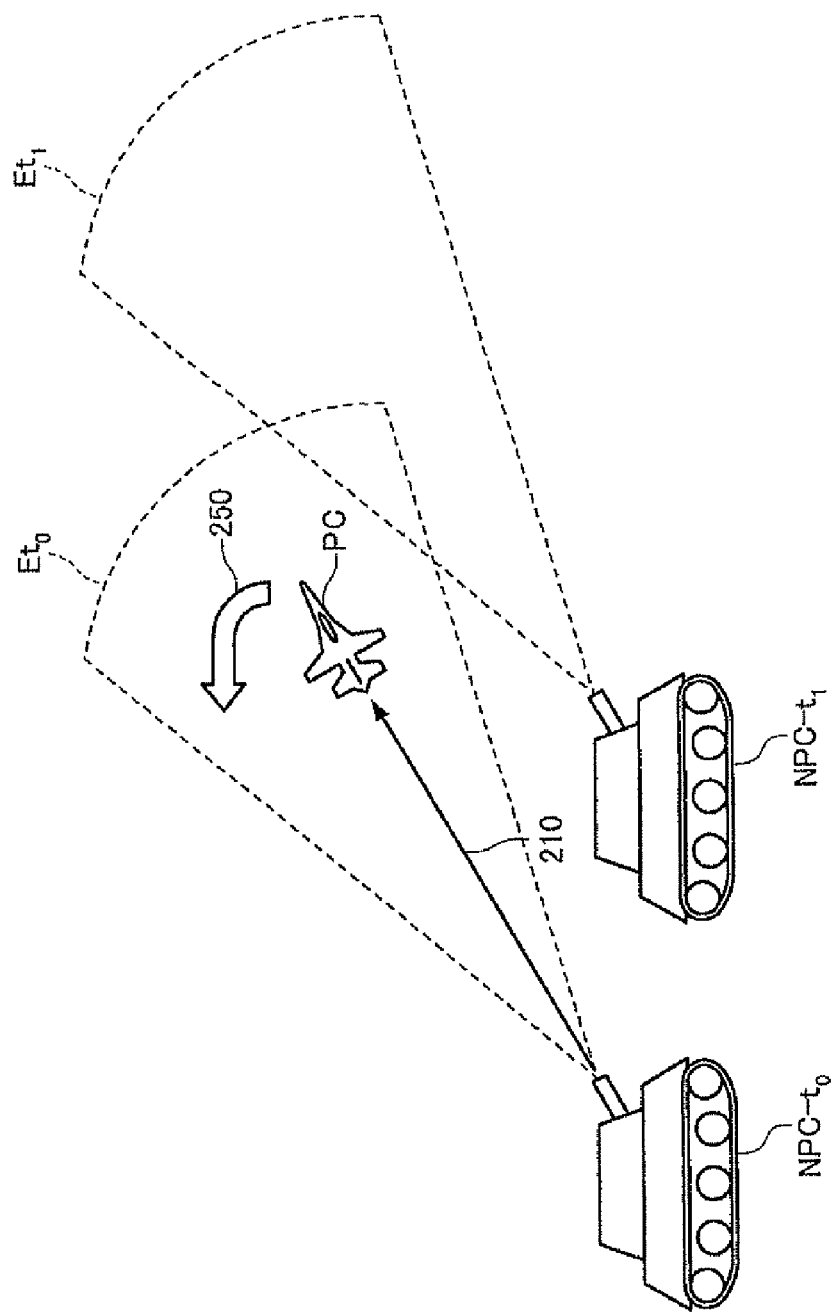
FIG. 14 is a diagram illustrating an optimal movement direction notification image display control process.

FIG. 14 is a diagram illustrating an optimal movement direction notification image display control process.

An optimal movement direction of the operation object PC may be calculated based on the positional relationship between the non-operation object NPC set to the lock-on state (example of the attack target tracking state) and the operation object PC, and an optimal movement direction notification image 250 that indicates the calculated optimal movement direction may be displayed.

For example, a lock-on range Et0 of a non-operation object NPC-t0 at a time t0 (current time) and a lock-on range Et1 of a non-operation object NPC-t1 at a time t1 (after one frame) may be calculated, and a direction along which the operation object PC moves away from the lock-on ranges Et0 and Et1 may be calculated and displayed as the optimal movement direction notification image 250.

The optimal movement direction notification image 250 may be drawn within a two-dimensional image obtained by perspective projection transformation. Alternatively, the optimal movement direction notification image 250 may be disposed in the virtual three-dimensional space as an object in the same manner as the operation object and the non-operation object.

2-9. Process According to this Embodiment

Figure 16:
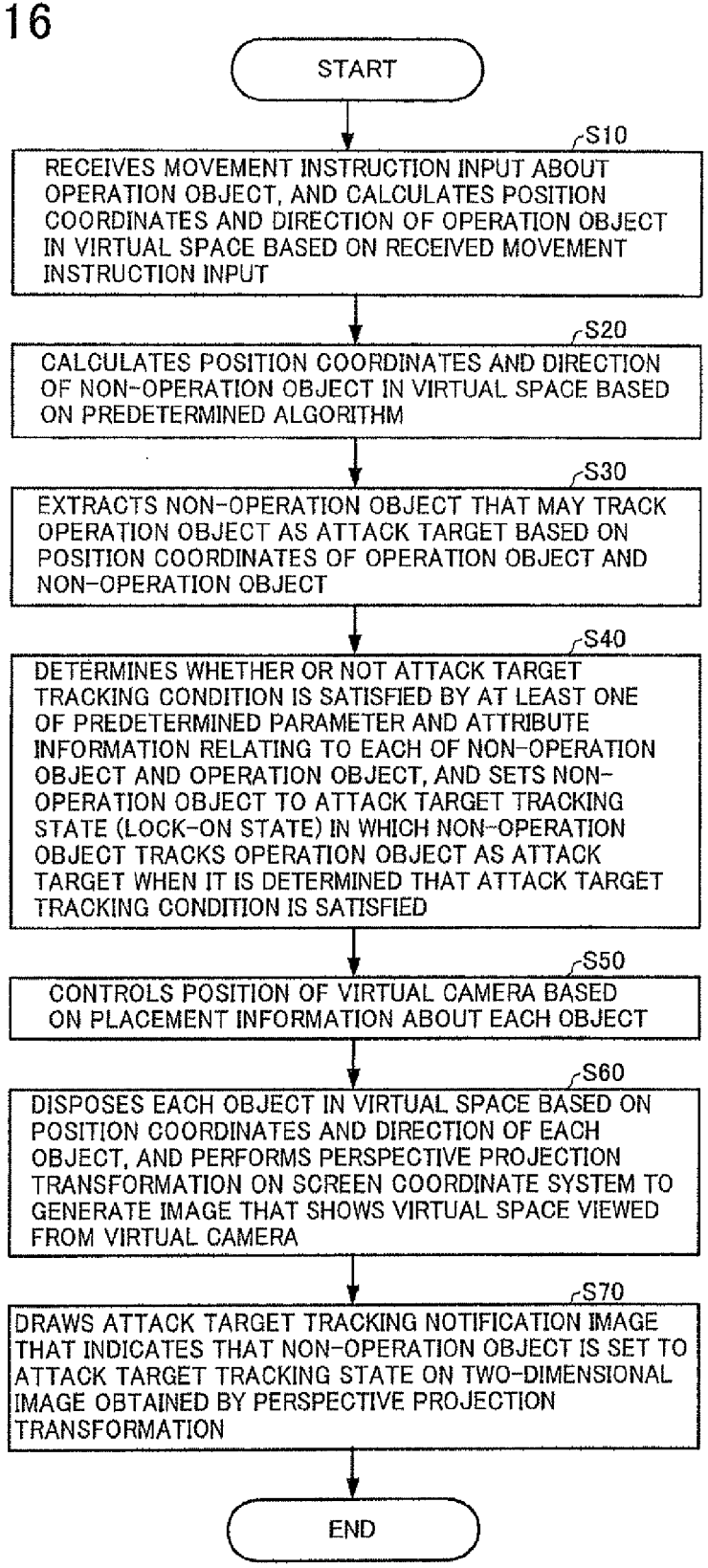
FIG. 16 is a flowchart illustrating the flow of a process that displays an attack target tracking notification image according to one embodiment of the invention.

FIG. 16 is a flowchart illustrating the flow of a process that displays the attack target tracking notification image according to this embodiment.

The following process may be performed every frame.

The movement instruction input about the operation object is received, and the position coordinates and the direction of the operation object in the virtual space are calculated based on the received movement instruction input (step s10).

The position coordinates and the direction of the non-operation object in the virtual space are calculated based on a predetermined algorithm (step S20).

The non-operation object that may track the operation object as an attack target is extracted based on the position coordinates of the operation object and the non-operation object (step S30). For example, the non-operation object that may track the operation object may be extracted from a predetermined range around the operation object.

Whether or not the attack target tracking condition is satisfied by at least one of the predetermined parameter and the attribute information relating to each of the extracted non-operation object and the operation object is determined, and the non-operation object is set to the attack target tracking state (lock-on state) in which the non-operation object tracks the operation object as the attack target when it is determined that the attack target tracking condition is satisfied (step s40). The step S40 is performed on each of the extracted non-operation objects. An upper limit may be set to the number of non-operation objects that can be set to the attack target tracking state, and a plurality of non-operation objects may be set to the attack target tracking state so that the upper limit is not exceeded.

The placement of the virtual camera is controlled based on the placement information about each object (step S50). For example, the virtual camera may be disposed at a position at which the non-operation object set to the attack target tracking state and the operation object are positioned within the field-of-view range of the virtual camera.

Each object is disposed in the virtual space based on the position coordinates and the direction of each object, and perspective projection transformation is performed on the screen coordinate system to generate an image that shows the virtual space viewed from the virtual camera (step S60).

The attack target tracking notification image that indicates that the non-operation object is set to the attack target tracking state is drawn on the two-dimensional image obtained by perspective projection transformation (step S70).

An upper limit may be set to the number of attack target tracking notification images to be displayed, a plurality of non-operation objects may be selected based on a predetermined priority standard so that the upper limit is not exceeded, and the attack target tracking notification images that indicate that the selected non-operation objects are set to the attack target tracking state may be displayed.

Figure 17:
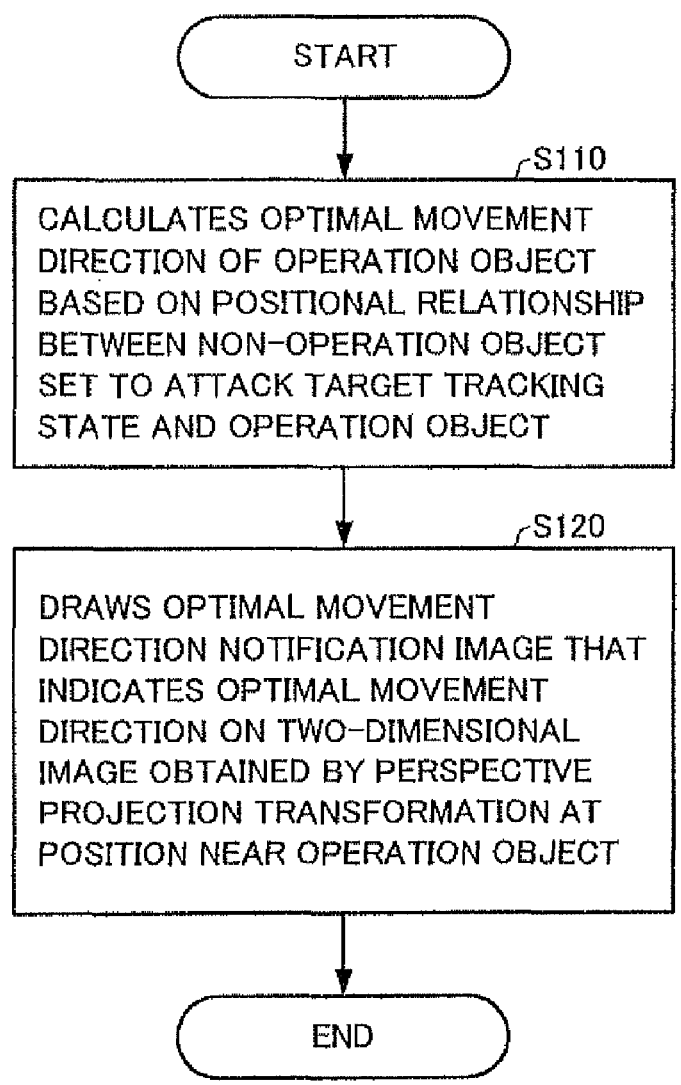
FIG. 17 is a flowchart illustrating the flow of a process that displays an optimal movement direction image according to one embodiment of the invention.

FIG. 17 is a flowchart illustrating the flow of a process that displays the optimal movement direction image according to this embodiment.

The following process may be performed every frame.

The optimal movement direction of the operation object is calculated based on the positional relationship between the non-operation object set to the attack target tracking state and the operation object (step S110).

The optimal movement direction notification image that indicates the optimal movement direction is drawn on the two-dimensional image obtained by perspective projection transformation at a position near the operation object (step S120).

The invention is not limited to the above-described embodiments. Various modifications and variations may be made. For example, any term cited with a different term having a broader meaning or the same meaning at least once in the specification and the drawings may be replaced by the different term in any place in the specification and the drawings.

Figure 18:
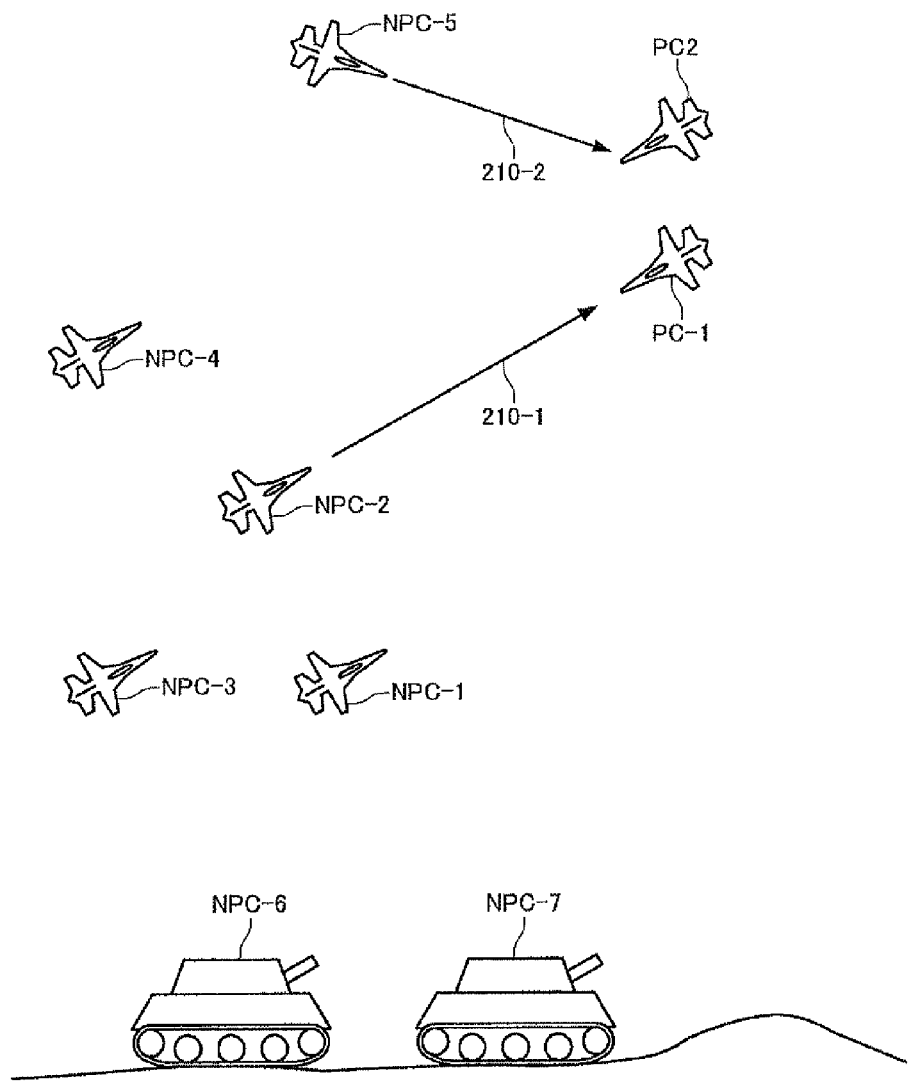
FIG. 18 is a diagram illustrating a modification of one embodiment of the invention.

The above embodiments have been described taking an example in which the lock-on notification image is displayed when the operation object (i.e., player's character) has been locked on by the non-operation object. Note that the invention is not limited thereto. As illustrated in FIG. 18, the lock-on notification image 210-2 may be displayed when a player's operation object PC-1 and an operation object PC-2 (teammate character) (may be a second player's character operated by the player; or an operation object operated by another player who belong to the same team as the player) have been locked on by the non-operation objects.

Figure 19A:
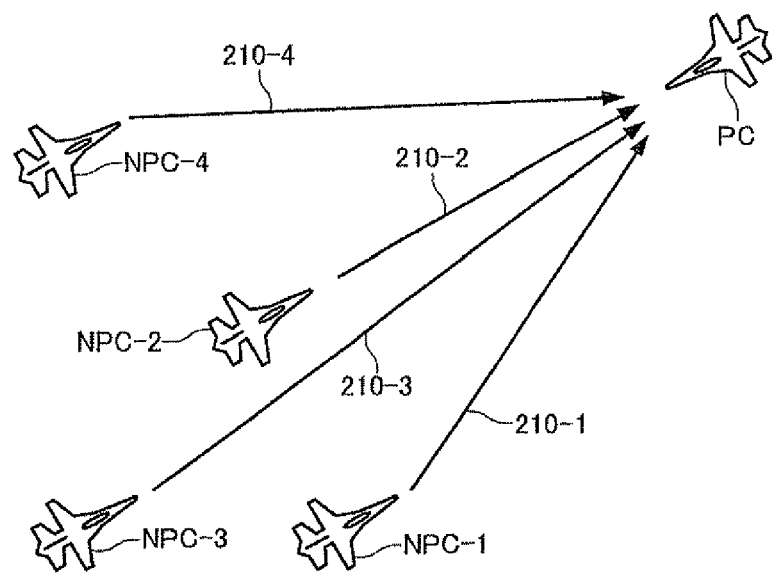
FIGS. 19A and 19B are diagrams illustrating a modification of one embodiment of the invention.
Figure 19B:
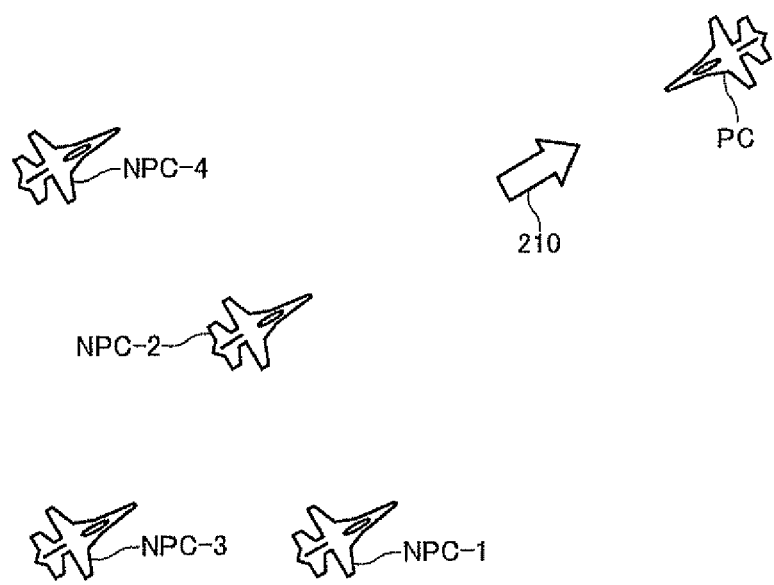

The above embodiments have been described taking an example in which the lock-on notification images 210-1 to 210-4 respectively corresponding to the non-operation objects NPC-1 to NPC-4 are displayed when the non-operation objects NPC-1 to NPC-4 are set to the lock-on state (see FIG. 19A). Note that the invention is not limited thereto. As illustrated in FIG. 19B, one lock-on notification image 210 corresponding to the non-operation objects NPC-1 to NPC-4 may be displayed, for example. This makes it possible to prevent a situation in which the game image (screen) becomes intricate due to the lock-on notification images 210.

The above embodiments have been described taking an example in which the lock-on notification image is displayed within the main game image. Note that the invention is not limited thereto. For example, a sub-image (e.g., radar image) may be set separately from or as part of the main game image, and the lock-on notification image may be displayed within the sub-image (e.g., radar image). This makes it possible to prevent a situation in which the game image becomes intricate due to the lock-on notification image 210.

The invention may be applied to various game systems such as an arcade game system, a consumer game system, a portable game system, and a system board that generates a game image.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. An information storage medium storing a program that generates an image of a virtual space viewed from a virtual camera, an operation object and a non-operation object being disposed in the virtual space, the program causing a computer to function as:

an operation object movement control section that receives a movement instruction input about the operation object, and controls a movement of the operation object in the virtual space based on the received movement instruction input;

a non-operation object movement/motion control section that controls at least one of a movement and a motion of the non-operation object in the virtual space based on a predetermined algorithm;

an attack target setting section that determines whether or not an attack target tracking condition is satisfied by at least one of the operation object and the non-operation object, and sets the non-operation object to an attack target tracking state in which the non-operation object tracks the operation object as an attack target when it is determined that the attack target tracking condition is satisfied;

a display control section that displays an attack target tracking notification image that indicates that the non-operation object is set to the attack target tracking state when the non-operation object is set to the attack target tracking state; and an image generation section that generates an image of the virtual space viewed from the virtual camera, the operation object being disposed in the virtual space, wherein the display control section displays an attack target tracking notification image in the virtual space between the non-operation object and the operation object within a main game image, and the image generation section that generates an attack target tracking notification image is disposed in the virtual space as an object in the same manner as the operation object and the non-operation object.

2. The information storage medium as defined in claim 1, wherein the attack target setting section sets the non-operation object to the attack target tracking state on condition that the non-operation object and the operation object are positioned within a field-of-view range of the virtual camera.

3. The information storage medium as defined in claim 1, wherein the image generation section disposes the virtual camera at a position at which the non-operation object set to the attack target tracking state and the operation object are positioned within a field-of-view range of the virtual camera.

4. The information storage medium as defined in claim 1, wherein the attack target setting section sets an upper limit to the number of non-operation objects that can be set to the attack target tracking state, and sets a plurality of non-operation objects to the attack target tracking state so that the upper limit is not exceeded.

5. The information storage medium as defined in claim 1, wherein the display control section determines a display style of the attack target tracking notification image based on attribute information or a parameter of the non-operation object.

6. The information storage medium as defined in claim 1, wherein the attack target setting section determines whether or not the attack target tracking condition is satisfied by at least one of a predetermined parameter and attribute information relating to each of the operation object and a first non-operation object, and sets a second non-operation object that is associated with the first non-operation object to the attack target tracking state when it is determined that the attack target tracking condition is satisfied; and wherein the display control section displays the attack target tracking notification image that indicates that the second non-operation object is set to the attack target tracking state.

7. The information storage medium as defined in claim 1, wherein the display control section calculates an optimal movement direction of the operation object based on a positional relationship between the non-operation object set to the attack target tracking state and the operation object, and displays an optimal movement direction notification image that indicates the calculated optimal movement direction.

8. The information storage medium as defined in claim 1, wherein the display control section changes a display style of the attack target tracking notification image based on at least one of attribute information and a predetermined parameter relating to each of the non-operation object set to the attack target tracking state and the operation object.

9. The information storage medium as defined in claim 1, wherein the display control section sets an upper limit to the number of attack target tracking notification images to be displayed, selects a plurality of non-operation objects based on a predetermined priority standard so that the upper limit is not exceeded, and displays the attack target tracking notification images that indicate that the selected non-operation objects are set to the attack target tracking state.

10. The information storage medium as defined in claim 1, wherein the display control section displays at least one member of the group consisting of: (1) an arrow that links the non-operation object to the operation object, (2) a line segment that links the non-operation object to the operation object, (3) a mark that indicates the non-operation object may be displayed near the operation object, and (4) a mark that specifies the non-operation object may be displayed near the non-operation object as the attack target tracking notification image.

11. The information storage medium as defined in claim 1, wherein the display control section displays an attack target tracking notification image within the image of the virtual space from a third person perspective.

12. The information storage medium as defined in claim 1, wherein the display control section changes a display style of the attack target tracking notification image depending on a degree of danger.

13. A game device that generates an image of a virtual space viewed from a virtual camera, an operation object and a non-operation object being disposed in the virtual space, the game device comprising:

an operation object movement control section that receives a movement instruction input about the operation object, and controls a movement of the operation object in the virtual space based on the received movement instruction input;

a non-operation object movement/motion control section that controls at least one of a movement and a motion of the non-operation object in the virtual space based on a predetermined algorithm;

an attack target setting section that determines whether or not an attack target tracking condition is satisfied by at least one of the operation object and the non-operation object, and sets the non-operation object to an attack target tracking state in which the non-operation object tracks the operation object as an attack target when it is determined that the attack target tracking condition is satisfied;

a display control section that displays an attack target tracking notification image that indicates that the non-operation object is set to the attack target tracking state when the non-operation object is set to the attack target tracking state; and an image generation section that generates an image of the virtual space viewed from the virtual camera, the operation object being disposed in the virtual space, wherein the display control section displays an attack target tracking notification image in the virtual space between the non-operation object and the operation object within a main game image, and the image generation section that generates an attack target tracking notification image is disposed in the virtual space as an object in the same manner as the operation object and the non-operation object.

14. The game device as defined in claim 13, wherein the attack target setting section sets the non-operation object to the attack target tracking state on condition that the non-operation object and the operation object are positioned within a field-of-view range of the virtual camera.

15. The game device as defined in claim 13,
wherein the image generation section disposes the virtual camera at a position at which the non-operation object set to the attack target tracking state and the operation object are positioned within a field-of-view range of the virtual camera.

16. The game device as defined in claim 13,
wherein the attack target setting section sets an upper limit to the number of non-operation objects that can be set to the attack target tracking state, and sets a plurality of non-operation objects to the attack target tracking state so that the upper limit is not exceeded.

17. The game device as defined in claim 13,
wherein the display control section determines a display style of the attack target tracking notification image based on attribute information or a parameter of the non-operation object.

18. The game device as defined in claim 13,
wherein the attack target setting section determines whether or not the attack target tracking condition is satisfied by at least one of a predetermined parameter and attribute information relating to each of the operation object and a first non-operation object, and sets a second non-operation object that is associated with the first non-operation object to the attack target tracking state when it is determined that the attack target tracking condition is satisfied; and
wherein the display control section displays the attack target tracking notification image that indicates that the second non-operation object is set to the attack target tracking state.

19. The game device as defined in claim 13,
wherein the display control section calculates an optimal movement direction of the operation object based on a positional relationship between the non-operation object set to the attack target tracking state and the operation object, and displays an optimal movement direction notification image that indicates the calculated optimal movement direction.

20. The game device as defined in claim 13,
wherein the display control section changes a display style of the attack target tracking notification image based on at least one of attribute information and a predetermined parameter relating to each of the non-operation object set to the attack target tracking state and the operation object.

21. The game device as defined in claim 13,
wherein the display control section sets an upper limit to the number of attack target tracking notification images to be displayed, selects a plurality of non-operation objects based on a predetermined priority standard so that the upper limit is not exceeded, and displays the attack target tracking notification images that indicate that the selected non-operation objects are set to the attack target tracking state.

22. A game system that generates an image of a virtual space viewed from a virtual camera, an operation object and a non-operation object being disposed in the virtual space the game system comprising:
   an operation object movement control section that receives a movement instruction input about the operation object, and controls a movement of the operation object in the virtual space based on the received movement instruction input;
   a non-operation object movement/motion control section that controls at least one of a movement and a motion of the non-operation object in the virtual space based on a predetermined algorithm;
   an attack target setting section that determines whether or not an attack target tracking condition is satisfied by at least one of the operation object and the non-operation object, and sets the non-operation object to an attack target tracking state in which the non-operation object tracks the operation object as an attack target when it is determined that the attack target tracking condition is satisfied;
   a display control section that displays an attack target tracking notification image that indicates that the non-operation object is set to the attack target tracking state when the non-operation object is set to the attack target tracking state; and
   an image generation section that generates an image of the virtual space viewed from the virtual camera, the operation object being disposed in the virtual space, wherein
   the display control section displays an attack target tracking notification image in the virtual space between the non-operation object and the operation object within a main game image, and
   the image generation section that generates an attack target tracking notification image is disposed in the virtual space as an object in the same manner as the operation object and the non-operation object.

* * * * *